UNITED STATES PATENT OFFICE.

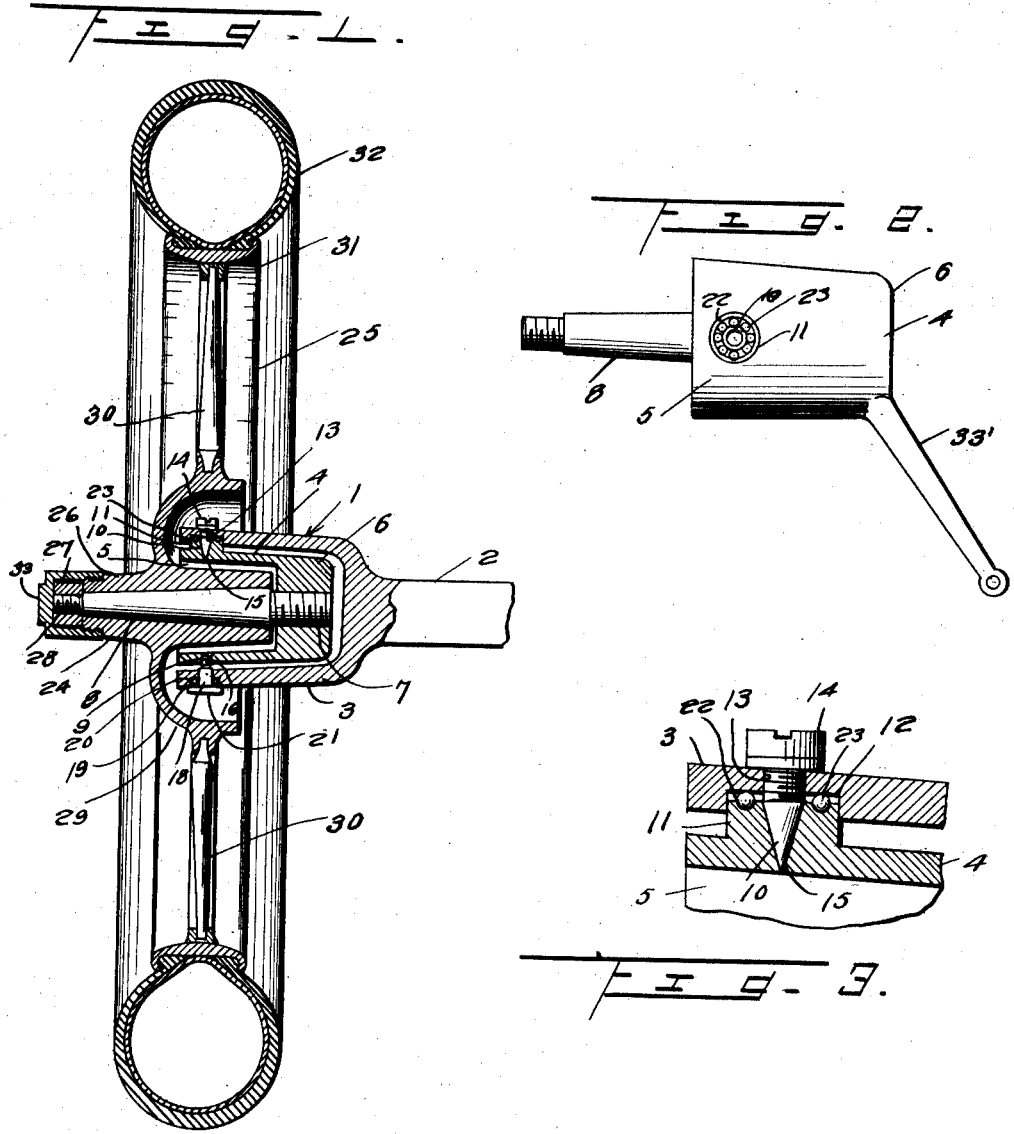
W. HAYLOR.
FRONT WHEEL STEERING MECHANISM FOR MOTOR VEHICLES.
APPLICATION FILED JUNE 7, 1919.
1,390,903.
Patented Sept. 13, 1921.
Inventor
Wm. Haylor.
By  Attorney.

WILLIAM HAYLOR, OF HEPPNER, OREGON.

FRONT-WHEEL STEERING MECHANISM FOR MOTOR-VEHICLES.

1,390,903.   Specification of Letters Patent.   Patented Sept. 13, 1921.

Application filed June 7, 1919. Serial No. 302,424.

*To all whom it may concern:*

Be it known that I, WILLIAM HAYLOR, a citizen of the United States, residing at Heppner, in the county of Morrow and State of Oregon, have invented certain new and useful Improvements in Front-Wheel Steering Mechanisms for Motor-Vehicles; and I do hereby declare the following to be a full, clear, and exact description of the invention, such as will enable others skilled in the art to which it appertains to make and use the same.

This invention relates to steering mechanism for front wheels of motor vehicles and the primary object of the invention is to provide means whereby the pivot point of each front wheel is directly in alinement with the vertical axis of the wheel, whereby a perfect pivot section of the wheels will be had when turning and eliminate the present method of having the steering or pivot joints inside of the front wheels, which permits undue wear of the tires in turning and strain on the steering gear.

Another object of the invention is to provide an improved hub for steering wheels for motor vehicles whereby the same may be pivotally secured to the front axle of a vehicle with the pivot point in alinement with the vertical axis of the wheel.

Another object of the invention is to improve the construction of the stub axle or spindle so as to provide a guard for the same and an additional support for the wheel in case the spindle is broken.

A further object of the invention is to provide an improved means for connecting the spindle to the front axle so as to permit the easy turning of the spindle and permit the spindle to be adjusted in relation to the front axle.

A still further object of the invention is to provide an improved device of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more fully described and set forth in the accompanying drawings forming a part thereof in which:

Figure 1 is a vertical section through the improved stearing means,

Fig. 2 is a detail view of the spindle, and

Fig. 3 is an enlarged section through one end of the axle, showing the adjustable pivot point carried by the same.

Referring to the drawings in detail, wherein similar reference characters designate corresponding parts throughout the several views, the numeral 1 generally indicates the improved device which includes the front axle 2 of a motor vehicle of the ordinary or any preferred construction having its ends forked, as at 3, for receiving the cup-shaped member 4, which includes the cylindrical side walls 5 and the relatively thick inner end wall 6, which is provided with a threaded bore 7 in which is turned the spindle 8, the forward end of which projects outwardly from the side walls. The side walls of the cup-shaped member 4 are provided with openings 9 and 10 which are in direct vertical alinement with each other. The upper opening 10 has formed around the same the flange 11 which is adapted to be received in the groove 12 formed in the upper arm of the fork-shaped terminal 3 of the front axle 2. The upper arm is provided with a threaded opening 13, which is arranged concentric with the groove 12, and this opening has turned therein the adjusting screw 14, the inner end of which is pointed, as at 15, and adjustably fitted in the opening 10. The lower opening 9 is internally threaded and receives the lower pivot bolt 15, which has its inner end reduced and threaded, as at 16, and fitted in the threaded opening 9. The outermost portion of the shank is rotatably received in the opening 18 formed in the lower arm of the fork 3; the opening is in direct alinement with the opening 13 in the upper arm and the lower surface of the fork is provided with an annular groove 19 around the opening, which forms a race for the ball-bearings 20 which bear against the relatively large head 21 of the adjusting screw. The flange 11 is also provided with an inner annular groove 22 for the reception of ball bearings 23, which forms means whereby the cup shaped member may be readily turned in the fork 3. The spindle 8 receives the hub 24 of the wheel 25, and the hub 24 includes the tubular sleeve 26 which forms the bearing for the hub and the same is held in place by means of the spindle nut 27, which is threaded on the reduced end 28 of the spindle and the inner face of the nut engages the outer end of the sleeve and prevents lateral movement thereof. The sleeve 26 has formed thereon intermediate its ends the annular arcuate flange 29, the free edge of which extends over the terminals of the fork 3 of the axle 2 and the outer surface of the flange has secured thereto spokes 30, which may be either the ordinary wooden or wire spoke, as desired, and the terminals of the spokes are secured to the ordinary type of rim 31 upon which is mounted the tire 32. By forming the annular arcuate flange 29, the pivots 14 and 16 are in direct alinement with the vertical axis of the wheel 25, giving a perfect pivot action to the wheel when turning. The cup-shaped member 4 is provided with the ordinary steering arms 33′ which are connected to the ordinary steering mechanism, not shown, of the motor vehicle. The outer terminal of the sleeve 26 is externally threaded and receives a hub cap 33 and forms a dust-proof closure for the same. The cylindrical side walls 5 of the cup-shaped member 4 not only form means for pivotally connecting the spindle to the forked end of the axle, but also form a dust-guard for the inner end of the spindle and prevent the entrance of dirt and the like thereto.

From the foregoing description, it can be seen that an improved means is provided for attaching the steering wheel of an automobile to the axle, in which the pivot point is in direct alinement with the vertical axis of the wheel, which permits a rigid axle in the center of each front wheel thus reducing friction and strain on the steering joint pivot through the tendency of the wheels to wabble and turn around and eliminating the danger of a short turn and the machine turning over. The improved means also results in saving the wear on the tires and allows the machine to be readily steered, and prevents the wheels from becoming out of alinement and the breaking of the spindle. The cylindrical body 5 of the cup-shaped member 4 also forms additional means for engaging the sleeve 26 of the hub 24 in case the spindle breaks and allows the machine to be stopped before a series accident happens.

In constructing the device, the axle 2 may be secured to the chassis of a motor vehicle so that the fork will be at an incline to the vertical which would permit the front wheels to tilt over to the right or left when turning a corner and thus counteract the strain on the wheels.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

A front wheel steering mechanism for a motor vehicle comprising a forked axle end, said fork having vertical openings extending through the upper and lower arms thereof, one of said openings being threaded, a socket formed around the last mentioned opening on the inner face of the upper arm of the fork, a cup-shaped member positioned in said fork and having openings in its upper and lower portions, the opening in the lower portion registering with the opening of the lower arm of the fork and being interiorly threaded, a pivot member extended through the opening in the lower arm of the fork and threaded in the threaded opening of said cup-shaped member, the opening in the upper portion of said cup-shaped member being tapered downwardly, an enlargement formed on the upper face of said cup-shaped member around the tapered opening and adapted for engagement in the socket of the upper arm of the fork, an upper pivot screw threaded in the upper arm of said fork and having a tapered end extended into the tapered opening of said cup-shaped member, a wheel hub having one end extended into said cup-shaped member, said hub being provided with an annular arcuate flange inclosing the end of the cup-shaped member and the forked axle end, a spindle extended through said hub and having an inner end threaded in the thickened central portion of said cup-shaped member, and bearing means between the enlargement on said cup-shaped member and the main wall of the socket of the upper arm of the fork.

In testimony whereof I affix my signature in presence of two witnesses.

WILLIAM HAYLOR.

Witnesses:
 E. L. BERRY,
 E. H. HALL.